United States Patent [19]
Chassot

[11] Patent Number: 5,389,141
[45] Date of Patent: Feb. 14, 1995

[54] STABILIZATION OF PYRROLOPYRROLE PIGMENTS

[75] Inventor: Laurent Chassot, Praroman, Switzerland

[73] Assignee: Ciba-Geigy Corporation, Ardsley, N.Y.

[21] Appl. No.: 171,896

[22] Filed: Dec. 22, 1993

Related U.S. Application Data

[63] Continuation of Ser. No. 26,964, Mar. 5, 1993, abandoned.

[30] Foreign Application Priority Data

Mar. 5, 1992 [CH] Switzerland .................. 00692/92

[51] Int. Cl.$^6$ .................................................. C08K 5/00
[52] U.S. Cl. .................................. 106/498; 106/493; 106/494; 106/500; 106/505; 548/426
[58] Field of Search ............... 548/426; 106/493, 494, 106/498, 500, 505

[56] References Cited

U.S. PATENT DOCUMENTS

| | | | |
|---|---|---|---|
| 3,536,722 | 10/1970 | Murayama et al. | 546/20 |
| 3,542,729 | 11/1970 | Murauama et al. | 524/83 |
| 3,705,126 | 12/1972 | Matsui et al. | 524/102 |
| 3,936,456 | 2/1976 | Ramey et al. | 544/231 |
| 3,966,711 | 6/1976 | Rasberger | 540/482 |
| 3,970,632 | 7/1976 | Yashiura et al. | 524/87 |
| 3,971,757 | 7/1976 | Rasberger | 524/106 |
| 4,131,599 | 12/1978 | Brunetti et al. | 524/102 |
| 4,415,685 | 11/1983 | Iqbal et al. | 524/92 |
| 4,579,949 | 4/1986 | Rochat et al. | 546/167 |
| 4,920,228 | 4/1990 | Lai et al. | 546/224 |
| 5,001,233 | 3/1991 | Murray et al. | 540/29 |

FOREIGN PATENT DOCUMENTS

| | | |
|---|---|---|
| 0284800 | 10/1988 | European Pat. Off. |
| 0309401 | 3/1989 | European Pat. Off. |
| 45-25293 | 8/1970 | Japan |
| 50-58141 | 5/1975 | Japan |
| 54-38619 | 11/1979 | Japan |
| 57-119941 | 7/1982 | Japan |
| 0299323 | 4/1990 | Japan |

OTHER PUBLICATIONS

John F. W. Keana–"Newer Aspects of the Synthesis & Chemistry of Nitroxide, Spin Labels", Chem. Reviews, vol. 78, No. 1 (1978) pp. 37–64.

Volodarsky–Imidiazoline Nitroxides, vol. I pp. 5–23 no date.

Tetrahedron Letters, vol. 29, No. 37 pp. 4677–4680 (1988) no month.

J. Org. Chem. 1991, pp. 6110–6114 no month.

Journal of Polymer Science Kurosaki, et al. vol. 12, pp. 1407–1420 no month.

*Primary Examiner*—Karl Group
*Assistant Examiner*—Scott L. Hertzog
*Attorney, Agent, or Firm*—Michele A. Kovaleski

[57] ABSTRACT

Pigment compositions comprising
  a) at least one pyrrolo[3,4-c]pyrrole pigment of the formula

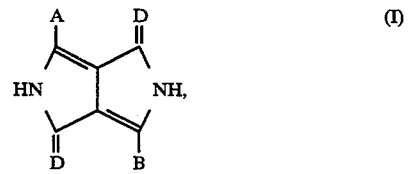

(I)

in which A and B, independently of one another, are isocyclic or heterocyclic aromatic radicals, and D is an oxygen or sulfur atom, and
  b) from 1 to 100% by weight, based on the pigment, of a nitroxyl compound or of an acid-addition salt thereof.

These pigment compositions are distinguished by excellent light stability and weathering resistance.

14 Claims, No Drawings

STABILIZATION OF PYRROLOPYRROLE PIGMENTS

This is a continuation of application Ser. No. 08/026,964, filed on Mar. 5, 1993, now abandoned.

The present invention relates to the stabilisation of pyrrolopyrrole pigments against the effects of light and weathering by addition of a nitroxyl compound.

Pyrrolo[3,4-c]pyrrole pigments have been known for some years and are described, for example, in U.S. Pat. No. 4,415,685 and U.S. Pat. No. 4,579,949. Some of these have proven successful as high-quality pigments. Although they already have very good light stability and weathering resistance, it has now been found that these properties can, surprisingly, be further improved, in particular in the case of transparent pigment forms, if the pigments are mixed with a nitroxyl compound.

Nitroxyl compounds are disclosed as stabilisers in various publications. JP-A 75-58 141 describes, amongst many other HALSs (hindered amine light stabilisers), nitroxyl compounds which, together with UV absorbers, serve to stabilise pigmented plastics against the effects of light. It is stated that the action of the UV absorbers as light stabilisers for the plastic is impaired by the pigments, but that this impairment can be reduced by means of an HALS. Preferred HALSs are those containing no nitroxyl groups. EP-A 309 401 discloses the use of N-hydroxy-HALSs for preventing inadequacies such as embfittlement, cracking, corrosion, erosion, loss of gloss, chalking and yellowing of coatings. U.S. Pat. No. 3,970,632 describes a polymer composition containing a quinophthalone pigment which, thanks to the addition of HALS, has high light stability and fading resistance. Although, in purely generic terms, nitroxyl compounds are also covered, specific mention is only made of nitroxyl-free HALSs. JP-A 82-119 941 discloses pigmented polymers containing a UV absorber and an HALS (without mentioning nitroxyl compounds) for preventing fading. JP-A 90-99 323 describes laminates which are stabilised against fading due to light and which contain in an intermediate layer a dye (mistakenly referred to as a pigment) which is soluble in an organic solvent and has been treated in dissolved form with a nitroxyl compound.

These publications reveal to a person skilled in the art that fading due to light of plastics coloured by means of soluble pigments can be reduced under certain conditions, for example in intermediate layers of laminates, on treatment of the dissolved dyes with a nitroxyl compound, but that the same effect is achieved in pigments plastics, together with stabilisation of the plastic, by admixture of a nitroxyl-free HALS.

It has now been found that very surprisingly, the light stability and weathering resistance of pyrrolopyrrole pigments, which is already high, can be further improved by mixing or coating the pigment particles with a nitroxyl compound.

The present invention accordingly relates to light-stabilised pigment compositions comprising a) at least one pyrrolo[3,4-c]pyrrole pigment of the formula

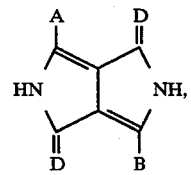

in which A and B, independently of one another, are isocyclic or heterocyclic aromatic radicals, and D is an oxygen or sulfur atom, and b) from 1 to 100% by weight, based on the pigment, of a nitroxyl compound or of an acid-addition salt thereof.

Pyrrolo[3,4-c]pyrrole pigments are known. They are described in detail, for example, in U.S. Pat. No. 4,415,685, columns 1, 2 and 3, and in particular in Examples 1, 6 and 27 to 49, and in U.S. Pat. No. 4,579,949, in particular in Examples 1 to 46.

The nitroxyl compounds are likewise known compounds. They are disclosed, for example, in the following publications:

Chemical Reviews, 1978, Vol. 78, No. 1, 37–64. (J. F. W. Keana, Newer Aspects of the Synthesis and Chemistiry of Nitroxide Spin Labels), in particular on pages 40–47;

Imidazoline Nitroxides, 1988, Vol. 1, 5–23 (L. B. Volodarsky, I. A. Grigorev, Synthesis of Heterocyclic Nitroxides);

Tetrahedron Letters, Vol. 29, No. 37, 4677–4680, 1988 (R. W. Murray, M. Singh, A Convenient High Yield Synthesis of Nitroxides);

J. Org. Chem, 1991, Vol. 56, 6110–6114 (Z. Ma, J. M. Bobbitt, Organic Oxoammonium Salts), in particular the examples on page 6114;

Journal of Polymer Science (Polymer Chemistiry Edition), 1974, Vol. 12, 1407–1420 (T. Kurosaki et al., Polymers Having Stable Radicals), in particular the examples on pages 1417–1419;

JP-A 90-99 323 (11.4.90), in particular Examples 1–34;

U.S. Pat. No. 3,536,722, formula I and in particular Examples 1–6;

U.S. Pat. No. 3,936,456, columns 1 and 2 and in particular Examples 7 and 8;

U.S. Pat. No. 3,971,757, formula I and Example 12;

U.S. Pat. No. 3,966,711, formula I and Example 7;

U.S. Pat. No. 4,131,599, columns 1 and 2 and Example 5;

U.S. Pat. No. 5,001,233, examples.

Of particular interest are pigment compositions in which a pyrrolo[3,4-c]pyrrole pigment of the formula I is employed, in which A and B, independently of one another, are groups of the formula

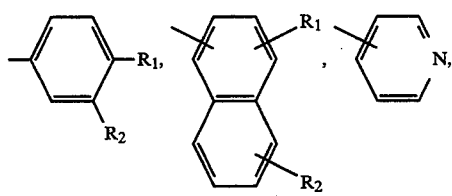

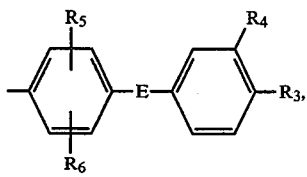

in which
- R₁ R₂, independently of one another, are hydrogen, halogen, $C_1$-$C_6$alkyl, $C_1$-$C_{18}$alkoxy, $C_1$-$C_{18}$alkylmercapto, $C_1$-$C_{18}$alkylamino, CN, NO₂, phenyl, trifluoromethyl, $C_5$-$C_6$cycloalkyl, imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl,
- E is —O—, —S—, —SO—, —SO₂— or —NR₇—,
- R₃ and R₄, independently of one another, are hydrogen, halogen, $C_1$-$C_6$alkyl, $C_1$-$C_{18}$alkoxy or CN,
- R₅ and R₆, independently of one another, are hydrogen, halogen or $C_1$-$C_6$alkyl, and
- R₇ is hydrogen or $C_1$-$C_6$alkyl.

Any halogen substituents are, for example, iodine, fluorine, in particular bromine and preferably chlorine.

$C_1$-$C_6$Alkyl is, for example, methyl, ethyl, n-propyl, isopropyl, n-butyl, sec-butyl, tert-butyl, n-amyl, tert-amyl or hexyl.

$C_1$-$C_{18}$Alkoxy is, for example, methoxy, ethoxy, n-propoxy, isopropoxy, butoxy, hexyloxy, decyloxy, dodecyloxy, hexadecyloxy or octadecyloxy.

$C_1$-$C_{18}$Alkylmercapto is, for example, methylmercapto, ethylmercapto, propylmercapto, butylmercapto, octylmercapto, decylmercapto, hexadecyhnercapto or octadecylmercapto.

$C_1$-$C_{18}$Alkylamino is, for example, methylamino, ethyl amino, propylamino, hexylamino, decylamino, hexadecylamino or octadecylamino.

$C_5$-$C_6$Cycloalkyl is cyclopentyl or, in particular, cyclohexyl.

Particular preference is given to pyrrolo[3,4-c]pyrrole pigments of the formula I in which A and B, independently of one another, are groups of the formula

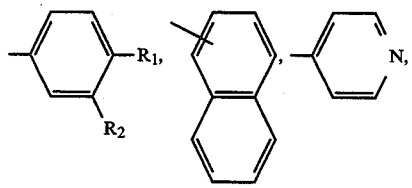

in which
- R₁ and R₂, independently of one another, are hydrogen, chlorine, bromine, $C_1$-$C_4$alkyl, $C_1$-$C_6$alkoxy, $C_1$-$C_6$alkylamino, CN or phenyl,
- E is —O—, —NR₇— or —SO₂—,
- R₃ and R₄ are hydrogen,
- R₇ is hydrogen, methyl or ethyl, and
- D is an oxygen atom, in particular those of the formula

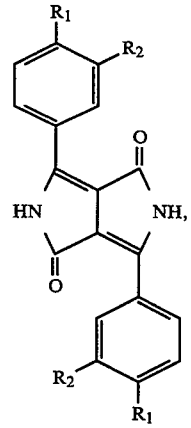

(II)

in which R₁ and R₂, independently of one another, are hydrogen, methyl, tert-butyl, chlorine, bromine, CN or phenyl.

The pyrrolo[3,4-c]pyrrole pigments are preferably used in fine form, i.e. in transparent form, having a mean particle size of from 0.005 to 0.1 μm, preferably from 0.01 to 0.07 μm.

The nitroxyl compound is preferably employed in an amount of 5–100 % by weight, based on the pigment.

In principle, any known nitroxyl compound, but if desired also novel nitroxyl compounds which can be prepared analogously to methods known in general terms, can be used for stabilisation. However, it is expedient to use a compound of the formula

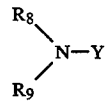

(III)

or a compound containing at least group of the formula

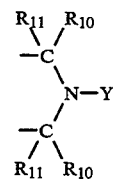

(IV)

or

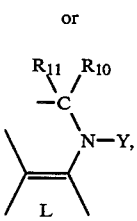

(V)

in which R₈ and R₉, independently of one another, are phenyl or naphthyl, which is unsubstituted or monosubstituted or disubsdtuted by $C_1$-$C_{18}$alkyl, $C_1$-$C_{18}$alkoxy or $C_2$-$C_{12}$alkenyl, or R₈ and R₉ together form a

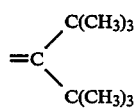

group, $R_{10}$ and $R_{11}$, independently of one another, are methyl, ethyl or phenyl, or together form a 4–12-membered aliphatic ring, or $R_{10}$ is hydrogen and the two $R_{11}$ radicals together are a divalent radical which, together with the

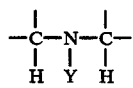

group, form a 4-, 5- or 6-membered ring,

L is an aromatic radical, and

Y is O•.

$R_{10}$ and $R_{11}$ are preferably methyl.

It is also possible to use inorganic or organic salts of nitroxyl compounds formed by addition of acids in maximum amounts equivalent to the nitroxyl groups. Such acids may be inorganic acids, for example sulfuric, hydrochloric or phosphoric acid, or organic carboxylic acids, such as formic, acetic, oxalic, maleic, benzoic or salicylic acid, organic sulfonic acids, such as methane- or p-toluenesulfonic acid, or organic phosphorus-containing acids, such as benzenephosphonic acid, methanephosphonic acid or benzenephosphinic acid.

Of particular interest are pigment compositions in which a nitroxyl compound of the formula

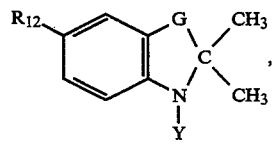 (VI)

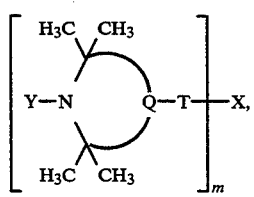 (VII)

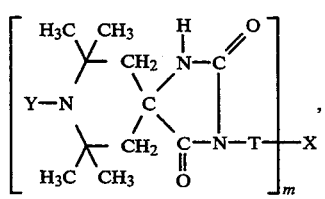 (VIII)

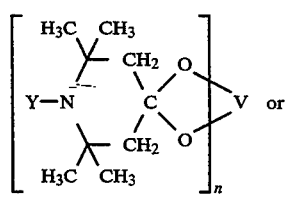 (IX)

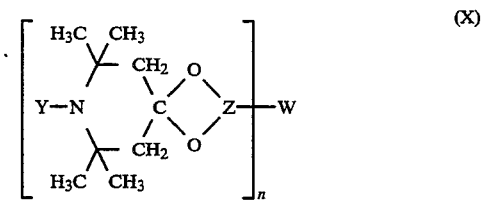 (X)

is used in which $R_{12}$ is $C_1$–$C_{18}$alkyl or $C_1$–$C_{18}$alkoxy,

G is a divalent group of the formula —$CR_{13}$=CH— or —$CHR_{13}$—$CH_2$— and $R_{13}$ is $C_1$–$C_{18}$alkyl, Q is a group of the formula

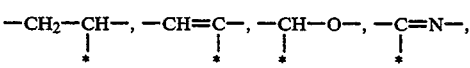

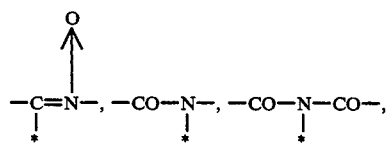

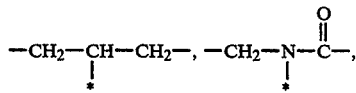

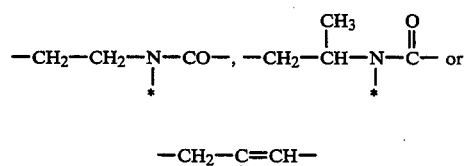

in which the bond denoted by * is the bond leading to T,

T is a direct bond or a group of the formula

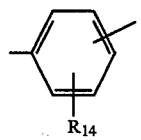

in which $R_{14}$ is hydrogen, halogen or $C_1$–$C_4$alkyl, or is —($CH_2$)$_r$—, in which r is 1 or 2, m is the number 1, 2, 3, 4 or 6, X, if m=1, is hydrogen, $C_1$–$C_{18}$alkyl, phenyl which is unsubstituted or substituted by $C_1$–$C_4$alkyl, $C_1$–$C_4$alkoxy, phenyl or halogen, or, under the condition that T, if bonded to a nitrogen atom, is not a direct bond, is a group of the formula —OCO—$NR_{15}R_{16}$, —$OSO_2$—$NR_{15}R_{16}$, —OCO—$R_{16}$, —$COOR_{16}$, —$CONR_{15}R_{16}$, —$NR_{15}$—$COR_{16}$, —$NR_{15}$—$CONR_{15}R_{16}$, —$OR_{16}$, —$NR_{15}R_{16}$,

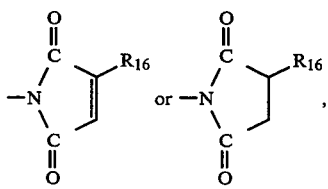

in which $R_{15}$ is hydrogen or $C_1$-$C_{18}$alkyl, $R_{16}$ is $C_1$-$C_{18}$alkyl, $C_2$-$C_{12}$alkenyl, $C_5$-$C_{12}$cycloalkyl, phenyl or naphthyl which is unsubstituted or substituted by $C_1$-$C_4$alkyl, $C_1$-$C_4$alkoxy, halogen, phenyl or nitro, or a —(CH$_2$-)$_s$—CHR$_{17}$R$_{18}$ group where s is zero, 1, 2 or 3, $R_{17}$ is hydrogen, methyl or phenyl, and $R_{18}$ is —OH, halogen, —COOCH$_3$ or —COOC$_2$H$_5$, if m=2, is a group of the formula —(CH$_2$)$_p$— or, under the condition that T, if bonded to a nitrogen atom, is not a direct bond, a group of the formula —O—(CH$_2$)$_p$—O—, —NR$_{15}$—(CH$_2$)$_p$—NR$_{15}$—, —OCO—F—COO—, —NR$_{15}$—CO—F—CO—NR$_{15}$—, —OCO—NH—F—NH—COO— or —NR$_{15}$—CONH—F—NHCO—NR$_{15}$—, in which F is —(CH$_2$)$_p$—,

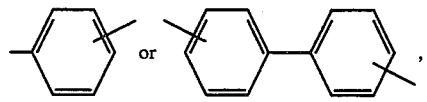

and p is a number between 2 and 10,
if m=3, is a

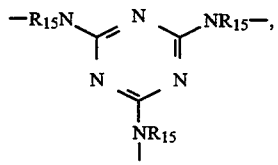

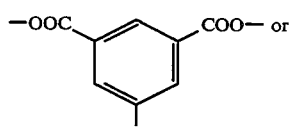

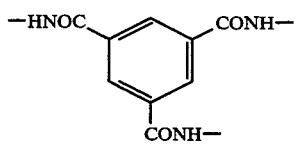

group, and
if m=4, is a

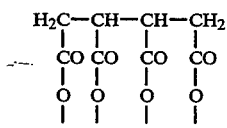

if m=6, is a

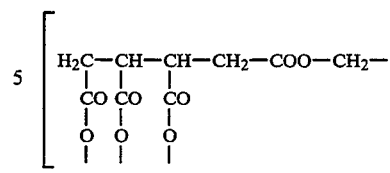

group, n is the number 1 or 2,

V, if n=1, is $C_2$-$C_8$alkylene, hydroxyalkylene or $C_4$-$C_{22}$acyloxyalkylene, and, if n=2, is the (—CH$_2$)$_2$C(CH$_2$—)$_2$ or

group, and
Z is a group of the formula

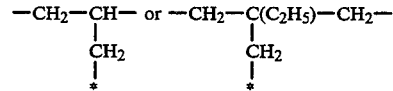

in which
the bond denoted by * is the bond leading to W,
W, if n=1, is a —OCOR$_{19}$ group, in which $R_{19}$ is $C_1$-$C_{18}$alkyl, or phenyl or naphthyl which is unsubstituted or substituted by $C_1$-$C_4$alkyl, $C_1$-$C_4$alkoxy or halogen, and
if n=2, is a group of the formula —OCO—(CH$_2$-)$_p$—COO— or

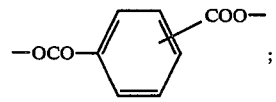

Y is O⊖.

Any $C_1$-$C_4$alkyl substituents are, for example, methyl, ethyl, n-propyl, isopropyl, n-butyl, sec-butyl or tert-butyl, and $C_1$-$C_{18}$alkyl is additionally, for example, n-amyl, tert-amyl, hexyl, heptyl, octyl, 2-ethylhexyl, decyl, dodecyl, tetradecyl, hexadecyl or octadecyl.

$C_1$-$C_4$-Alkoxy is, for example, methoxy, ethoxy, n-propoxy, isopropoxy or butoxy, and $C_1$-$C_{18}$alkoxy is additionally, for example, hexyloxy, decyloxy, dodecyloxy, hexadecyloxy or octadecyloxy.

Halogen is, for example, iodine, fluorine, in particular bromine and preferably chlorine.

Any $C_2$-$C_{12}$alkenyl substituents are, for example, vinyl, allyl, methallyl, 2-butenyl, 2-hexenyl, 3-hexenyl, 2-octenyl or 2-dodecenyl.

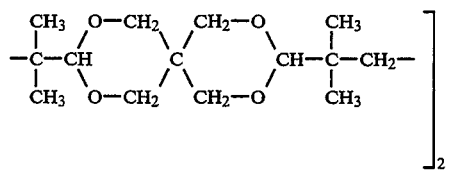

$C_5$-$C_{12}$cycloalkyl $R_{16}$ is, for example, cyclopentyl, cycloheptyl, cyclooctyl, cyclononyl, cyclododecyl or preferably cyclohexyl.

$C_2$-$C_8$alkylene or -hydroxyalkylene V is, for example, ethylene, 1-methylethylene, propylene, 2-ethylpropylene or 2-ethyl-2-hydroxymethylpropylene, and $C_4$-$C_{22}$acyloxyalkylene V is, for example, 2-ethyl-2-acetoxymethylpropylene.

Of particular interest are pigment compositions in which a nitroxyl compound of the formula VII, VIII or IX as defined above is used.

Particular preference is given to nitroxyl compounds of the formula

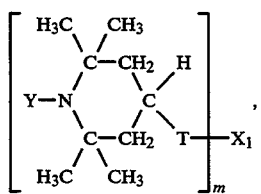

(XI)

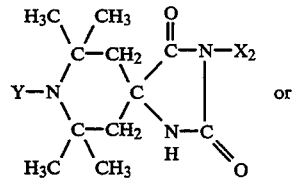

(XII)

or

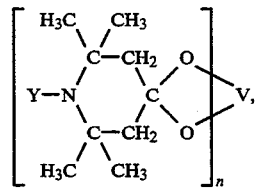

(XIII)

in which
T is a direct bond,
m is 1, 2 or 3,
$X_1$, if m=1, is $C_1$-$C_{18}$alkyl, —OCO—$R_{16}$, —NR$_{15}$—COR$_{16}$ or

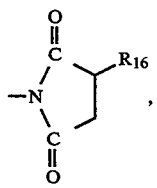

in which
$R_{15}$ is hydrogen or or $C_1$-$C_{18}$alkyl, and $R_{16}$ is $C_1$-$C_{18}$alkyl, or phenyl or naphtyl which is unsubstituted or substituted by $C_1$-$C_4$alkyl, $C_1$-$C_4$alkoxy, phenyl or halogen,
if m=2, is a —OCO—(CH$_2$)$_p$—OCO— or —NR$_{15}$CO—(CH$_2$)$_p$—CONR$_{15}$ group in which p is a number between 2 and 18,

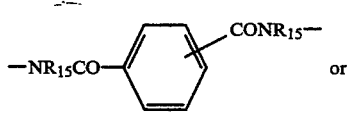

or

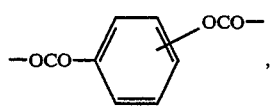

and
if m=3, is a

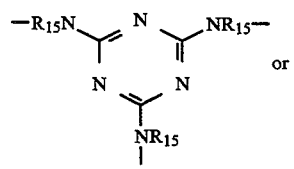

or

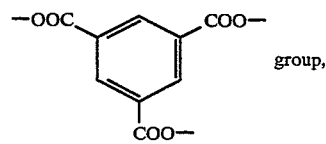

group, $X_2$ is $C_1$-$C_{18}$alkyl,
n is the number 2,
V is the (—CH$_2$)$_2$C(CH$_2$—)$_2$ or

group, and
Y is O•.

Preference is given to nitroxyl compounds of the formula XI or XII in which T is a direct bond, m is 1, $X_1$ is benzoyloxy or naphthyloxy, and $X_2$ is $C_8$-$C_{18}$alkyl.

As mentioned above, the pyrrolo[3,4-c]pyrrole pigments are stabilised by the admixture of a nitroxyl compound against the action of light and weathering, which can result in fading, but also darkening of the colourings. The novel admixing of the nitroxyl compound with the pigment has proven to be effective, ie stabilising, in both cases. Accordingly, the invention furthermore relates to a process for the light and weathering stabilisation of pyrrolo[3,4-c]pyrrole pigments of the formula

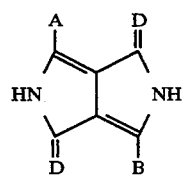

(I)

in which A and B, independently of one another, are isocyclic or heterocyclic aromatic radicals, and D is an oxygen or sulfur atom, by mixing or coating the pigment particles with from 1 to 100% by weight, based on the pigment, of a nitroxyl compound.

This can be carded out by the various methods below:

The nitroxyl compound in the desired amount is dissolved in an organic solvent. The pigment is suspended in this solution by conventional methods, and the resultant suspension is ground, if necessary, in a conventional mill. The pigment mixture is isolated by removing the solvent by distillation and is subsequently dried;

The necessary amount of nitroxyl compound is, dissolved in an organic solvent, added to a pigment suspension prepared by conventional methods and then, by addition of a solvent in which it is insoluble, for example water, is precipitated and co-suspended. The suspension is then filtered, and the pigment mixture is isolated by conventional methods;

In a preferred method, however, the pigment and the nitroxyl compound are either premixed or incorporated separately by conventional methods in the desired amount into the substrate to be pigmented.

The pigment compositions according to the invention are highly suitable as pigments for colouring high-molecular-weight organic material, in particular give high light stability and weathering resistance are required.

Examples of high-molecular-weight organic materials which can be pigmented by means of the pigment compositions according to the invention are cellulose ethers and cellulose esters, such as ethylcellulose, nitrocellulose, cellulose acetate and cellulose butyrate, natural or synthetic resins, such as polymerisation resins or condensation resins, such as amino resins, in particular urea- and melamine-formaldehyde resins, alkyd resins, phenolic resins, polycarbonates, polyolefins, polystyrene, polyvinyl chloride, polyamides, polyurethanes, polyesters, ABS, polyphenylene oxides, rubber, casein, silicone and silicone resins, individually or in mixtures.

The pigment compositions according to the invention are particularly suitable for colouring polyvinyl chloride and polyolefins, such as polyethylene and polypropylene, and for pigmenting paints, coating materials and printing inks. However, their high light stability means that they are also highly suitable for use in electrophotographic materials (for example photocells), coloured filters (for example liquid-crystal displays), information-storage materials (optical disks), nonlinear optics and in optical limiters. However, the pigment compositions according to the invention are preferably suitable for colouring water-borne and/or solvent-containing paints, in particular automotive paints. They are very particularly preferably used for special-effect finishes in which transparent organic pigments are employed.

The high-molecular-weight organic compounds mentioned may, individually or in mixtures, be in the form of plastic compositions, melts, spinning solutions, paints, coating materials or printing inks. Depending on the application, it has proven advantageous to employ the pigment compositions according to the invention as toners or in the form of formulations.

Based on the high-molecular weight organic material to be pigmented, the pigment compositions according to the invention can be employed in an amount of from 0.01 to 40% by weight, preferably from 0.1 to 20% by weight.

The pigmenting of the high-molecular-weight organic substances by means of the pigment compositions according to the invention is carried out, for example, by mixing a pigment composition of this type, if desired in the form of a masterbatch, or the individual components, with these substances using roll mills, mixers or grinders. The pigmented material is then converted into the final shape desired by processes known per se, such as calandering, compression moulding, extrusion, coating, casting or injection moulding. It is frequently desirable, for the production of non-rigid mouldings or to reduce their brittleness, to incorporate plasticisers into the high-molecular-weight compounds before shaping. These may be, for example, esters of phosphoric acid, phthalic acid or sebacic acid. The plasticisers can be incorporated into the polymers before or after incorporation of the pigment compositions according to the invention. In order to obtain different shades, it is furthermore possible to incorporate fillers or other chromophoric components such as white, coloured or black pigments, in any desired amounts in addition to the pigment compositions according to the invention.

For pigmenting paints, coating materials and printing inks, the high-molecular-weight organic materials and the pigment compositions according to the invention, if desired together with additives, such as fillers, other pigments, driers or plasticisers, are finely dispersed or dissolved in a joint organic solvent or solvent mixture. This can be done by dispersing or dissolving the individual components separately or more than one together and only then combining all the components.

In colorings, for example of paints, polyvinyl chloride or polyolefins, the pigment compositions according to the invention are distinguished by good general pigment properties, such as good dispersibility, high tinting strength and purity, and good migration, heat and in particular light and weathering resistance.

The examples below illustrate the invention. Parts are by weight, unless stated otherwise.

EXAMPLES 1–43

0.9 g of a red pigment of the formula

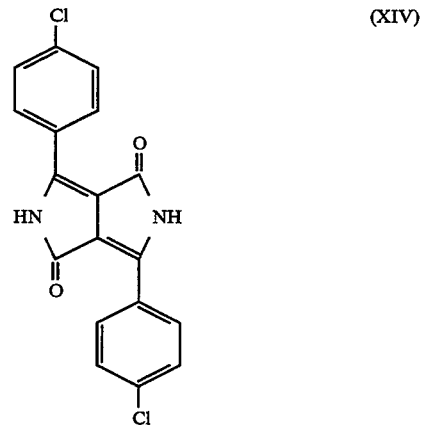

and 0.1 g of a nitroxyl compound of the formula

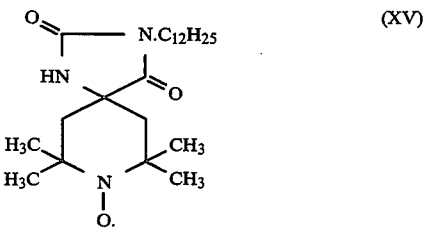

are suspended in 25 ml of methylene chloride by treatment with ultrasound for 3 minutes. The solvent is then removed by distillation, and the residue is dried (method A).

The stabilised pigment obtained is incorporated into an alkyd-melamine stoving lacquer as follows.

0.4 g of pigment/nitroxyl mixture, 7.6 g of $TiO_2$, 9 ml of methyl isobutyl ketone and 30 g of stoving lacquer comprising 66.5 parts of alkyd resin ®ALKYDAL F27 (Bayer AG), 24.4 parts of melamine resin ®MAPRENAL TTK (Hoechst AG), 2.1 pans of xylene, 4.0 parts of ethylene glycol and 1.0 part of silicone oil (1% in xylene) are mixed by conventional methods. The coloured paint is applied to aluminium sheeting and stoved for minutes at 130° C.

Further paint colourings are produced in precisely the same way, with the only exception that the nitroxyl compound of the formula XV is replaced by the same amount by weight of the nitroxyl compounds indicated in Table 1 below.

A control paint colouring is produced, again in the same way, with the exception that the pigment is employed without addition of nitroxyl compounds.

The weathering resistance of the resultant paint colourings is determined by the WOM test in accordance with DIN 53387 after weathering for 500 hours. In all the examples shown, better weathering resistance than in the control paint colouring can be demonstrated.

TABLE 1

| Example | Nitroxyl compound |
|---------|-------------------|
| 1 | [structure: tetramethylpiperidine N-oxyl with -CH2-C(=O)-NH- and -C(=O)-N-C12H25] |
| 2 | [structure: tetramethylpiperidine N-oxyl with O-C(=O)-phenyl (benzoate)] |
| 3 | [structure: bis(tetramethylpiperidine N-oxyl) spiro dioxolane, R = C(CH3)2]2 |
| 4 | [structure: bis(tetramethylpiperidine N-oxyl) diester with -(CH2)8-]2 |
| 5 | [structure: tetramethylpiperidine N-oxyl with NH-C12H25] |

TABLE 1-continued

| Example | Nitroxyl compound |
|---------|-------------------|
| 6 | [structure: tetramethylpiperidine N-oxyl with NH-C2H5] |
| 7 | [structure: tris(tetramethylpiperidine N-oxyl) with N(C4H9)-R, R = triazine]3 |
| 8 | [structure: tris(tetramethylpiperidine N-oxyl) with O-R, R = benzene-1,3,5-tricarbonyl]3 |
| 9 | [structure: tetramethylpiperidine N-oxyl with NH-C(=O)-phenyl (benzamide)] |
| 10 | [structure: tetraethylpiperidine N-oxyl with naphthalene-1-carboxylate ester] |
| 11 | [structure: tetraethylpiperidine N-oxyl with naphthalene-1-carboxamide] |
| 12 | [structure: tetramethylpiperidine N-oxyl with O-C(=O)-(CH2)10-CH3 (laurate)] |

TABLE 1-continued

| Example | Nitroxyl compound |
|---|---|
| 13 | 2-naphthoate ester of 4-amino-2,2,6,6-tetramethylpiperidine-1-oxyl |
| 14 | 2-naphthamide of 4-amino-2,2,6,6-tetramethylpiperidine-1-oxyl |
| 15 | 4-(4-cyanophenoxy)phenyl-substituted 2,2,6,6-tetramethylpiperidine-1-oxyl |
| 16 | 4-(4-hydroxyphenyl)-2,2,6,6-tetramethylpiperidine-1-oxyl |
| 17 | 4-(4-cyanophenoxy)-2,2,6,6-tetramethylpiperidine-1-oxyl |
| 18 | tris-substituted triazine with 2,2,6,6-tetramethylpiperidine-1-oxyl acetamide linkers, $R =$ N-methyl triazine |
| 19 | CH$_2$—CH—CH—CH$_2$ tetraester with OR groups |
| 20 | N-substituted succinimide with $C_{12}H_{25}$ and 2,2,6,6-tetramethylpiperidine-1-oxyl, $R =$ 2,2,6,6-tetramethylpiperidin-1-oxyl-4-yl and —$C_{13}H_{27}$ |
| 21 | bis(2,2,6,6-tetramethylpiperidin-1-oxyl-4-yl) terephthalate dimethyl ester, $R = $ terephthaloyl dimethyl ester |
| 22 | bis(2,2,6,6-tetramethylpiperidin-1-oxyl-4-yl) isophthalate, $R =$ isophthaloyl |
| 23 | bis(2,2,6,6-tetramethylpiperidin-1-oxyl-4-yl) phthalate, $R =$ phthaloyl |
| 24 | 11-bromoundecanoate ester of 4-hydroxy-2,2,6,6-tetramethylpiperidine-1-oxyl, Br—(CH$_2$)$_{10}$—CO—O— |
| 25 | 4-benzoyloxyphenyl-substituted 2,2,6,6-tetramethylpiperidine-1-oxyl |

TABLE 1-continued

| Example | Nitroxyl compound |
|---|---|
| 26 | 4-nitrobenzoate of 2,2,6,6-tetramethyl-4-hydroxypiperidine-1-oxyl |
| 27 | 4-biphenylcarboxylate of 2,2,6,6-tetramethyl-4-hydroxypiperidine-1-oxyl |
| 28 | 3,4,5-trimethoxybenzoate of 2,2,6,6-tetramethyl-4-hydroxypiperidine-1-oxyl |
| 29 | N-octyl benzamide of 4-amino-2,2,6,6-tetramethylpiperidine-1-oxyl |
| 30 | N-dodecyl benzamide of 4-amino-2,2,6,6-tetramethylpiperidine-1-oxyl |
| 31 | N-ethyl dodecanamide of 4-amino-2,2,6,6-tetramethylpiperidine-1-oxyl |
| 32 | 2-(benzoyloxymethyl)benzoate of 2,2,6,6-tetramethyl-4-hydroxypiperidine-1-oxyl |
| 33 | 2,6-dimethoxybenzoate of 2,2,6,6-tetramethyl-4-hydroxypiperidine-1-oxyl |
| 34 | 2-naphthalenesulfonamide of 4-amino-2,2,6,6-tetramethylpiperidine-1-oxyl |
| 35 | 1-naphthalenesulfonamide of 4-amino-2,2,6,6-tetramethylpiperidine-1-oxyl |
| 36 | bis-nitroxyl bis-benzamide with ethylene linker |
| 37 | N-ethyl 2-naphthamide of 4-amino-2,2,6,6-tetramethylpiperidine-1-oxyl |
| 38 | 3,5-dinitrobenzoate of 2,2,6,6-tetramethyl-4-hydroxypiperidine-1-oxyl |

Note: Structural drawings appear in the original table; names above are descriptive summaries of the depicted structures.

TABLE 1-continued

| Example | Nitroxyl compound |
|---|---|
| 39 | 9-oxo-fluorene-1-carboxylic acid ester of 4-hydroxy-2,2,6,6-tetramethylpiperidin-1-oxyl |
| 40 | 1-oxyl-2,2,6,6-tetramethylpiperidin-4-yl group with N-(CH$_2$)$_3$-O-CO-(CH$_2$)$_{10}$CH$_3$ succinimide-type substituent |
| 41 | 1-oxyl-2,2,6,6-tetramethylpiperidin-4-yl group with N-(CH$_2$)$_3$-O-CO-naphthyl succinimide-type substituent |
| 42 | 1-oxyl-2,2,6,6-tetramethylpiperidin-4-yl spiro-dioxolane with CH$_3$, CH$_2$-O-CO-(CH$_2$)$_{10}$CH$_3$ |
| 43 | 1-oxyl-2,2,6,6-tetramethylpiperidin-4-yl spiro-dioxolane with CH$_3$, CH$_2$-O-CO-naphthyl |

EXAMPLES 44–48

0.4 g of the pigment of the formula XIV and 0.04 g of the nitroxyl compounds shown in Table 2 are incorporated separately, but otherwise in the same way, into the same alkyd-melamine stoving lacquer (white reduction) as in Example 1 (method B). The weathering resistance of the paint colourings obtained is determined as described in Example 1. In all the examples shown, better weathering resistance than in the control coloured coating can be demonstrated using the same pigment.

TABLE 2

| Example | Nitroxyl Compound |
|---|---|
| 44 | 1-oxyl-2,2,6,6-tetramethylpiperidin-4-yl with NH-CO-N-C$_{12}$H$_{25}$ |

TABLE 2-continued

| Example | Nitroxyl Compound |
|---|---|
| 45 | [1-oxyl-2,2,6,6-tetramethylpiperidin-4-yl-N(C$_4$H$_9$)-]$_3$-R where R = triazine |
| 46 | 4-benzoyloxy-1-oxyl-2,2,6,6-tetramethylpiperidine |
| 47 | [1-oxyl-2,2,6,6-tetramethylpiperidin-4-yl-O-R]$_3$ where R = -OC-C$_6$H$_3$(CO-)$_2$ (benzene-1,3,5-tricarbonyl) |
| 48 | 4-benzamido-1-oxyl-2,2,6,6-tetramethylpiperidine |

EXAMPLES 49 and 50

0.2 g of the nitroxyl compound of the formula XV are added to a suspension of 2 g of the pigment of the formula XIV in methanol (the former dissolves in the methanol during the addition). The suspension is stirred for 2 hours, 100 ml of water are added, and the suspension is stirred at room temperature over night. A further 200 ml of water are then added, and the suspension is filtered. The residue is dried at 100° C. (method C).

The process is repeated, with the single exception that the nitroxyl compound of the formula XV is replaced by the same amount by weight of the nitroxyl compounds described in Example 7 dissolved in 7 ml of chloroform.

The two products are each incorporated in the same way into the same alkyd-melamine stoving lacquer (white reduction) as in Example 1. The weathering resistance of the coloured coatings obtained is determined as described in Example 1. In both examples, better weathering resistance than in the corresponding control coloured coating can be demonstrated.

TABLE 3

| Example | Nitroxyl compound |
|---------|-------------------|
| 49 | (structure: 2,2,6,6-tetramethylpiperidin-1-oxyl with -NH-C(=O)-N(C12H25)-C(=O)- substituent) |
| 50 | (structure: [2,2,6,6-tetramethylpiperidin-1-oxyl-N(C4H9)-]3-R where R = 1,3,5-triazine) |

EXAMPLE 51

2.65 g of the nitroxyl compound of the formula XV are dissolved in 25 ml of isopropanol, and 0.41 ml of 96 % $H_2SO_4$ is added to the solution. The mixture is allowed to stand over night, 150 ml of ether are then added, and the white precipitate is filtered and dried in a drying oven.

Example 1 is then repeated, with the single exception that the nitroxyl compound of the formula XV is replaced by the same amount by weight of the sulfuric acid salt obtained as described above. Better weathering resistance than in the corresponding control coloured coating is obtained.

EXAMPLE 52

Example 1 is repeated, with the exception that the pigment of the formula XIV is replaced by the same amount by weight of a pigment of the formula

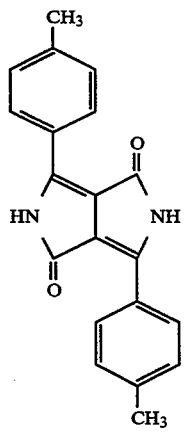

(XVI)

and the nitroxyl-compound of the formula XV is replaced by the same amount by weight of the nitroxyl compound described in Example 2. Better weathering resistance than in the corresponding control coloured coating is obtained.

EXAMPLE 53

The pigment/nitroxyl mixture obtained as described in Example 52 is incorporated into a masstone paint as follows:

10 g of pigment/nitroxyl mixture, 54 g of alkyl resin ®ALKYDAL 310 (Bayer AG), 60% in xylene, 13 g of melamine resin ®CYMEL 327 (Cyanamid), 90 % in butanol, 18 g of xylene, 2 g of butanol, 2 g of 1-methoxy-2-propanol and 1 g of silicone oil A ( 1% in xylene) are mixed by conventional methods. A coloured coating is produced using this mixture as described in Example 1 and its weathering resistance is determined. Better weathering resistance than in the corresponding control coloured coating is obtained.

EXAMPLES 54–77

Example 1 is repeated, with the exception that the pigment of the formula XIV is replaced by the same amount by weight of the pigment of the formula (XVII)

(structure: 3,6-bis(3-cyanophenyl)-2,5-dihydropyrrolo[3,4-c]pyrrole-1,4-dione)

and the nitroxyl compounds shown in Table 4 below. In all the examples, better weathering resistance is observed than for the corresponding control coloured coating.

TABLE 4

| Example | Nitroxyl compound |
|---------|-------------------|
| 54 | 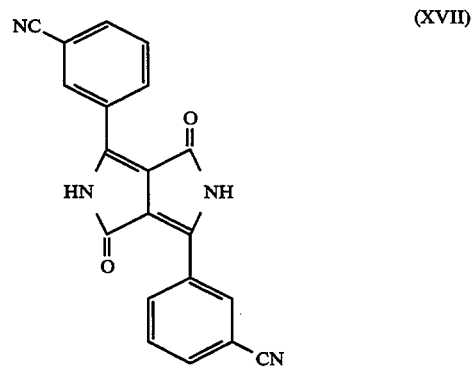 |
| 55 | (structure: [2,2,6,6-tetramethylpiperidin-1-oxyl-NH-]2-R where R = -OC(=O)-(benzene-1,3,5-triyl)-C(=O)O-, with third -C(=O)O- group) |

TABLE 4-continued
| Example | Nitroxyl compound |
|---|---|
| 56 | 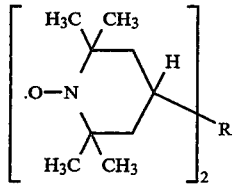 |
| 57 | 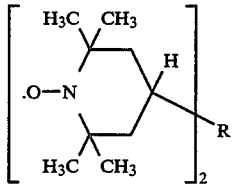 |
| 58 | 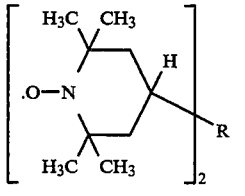 |
| 59 | 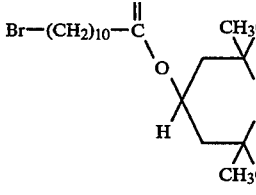 |
| 60 | 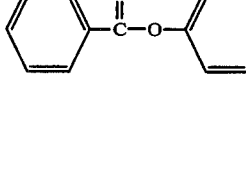 |
| 61 | 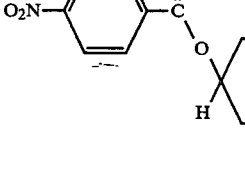 |
| 62 | 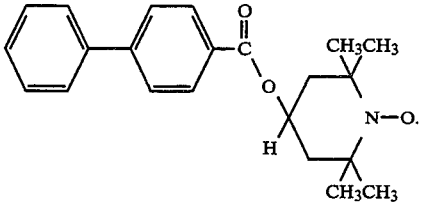 |
| 63 | 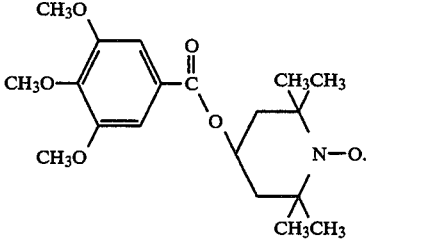 |
| 64 | 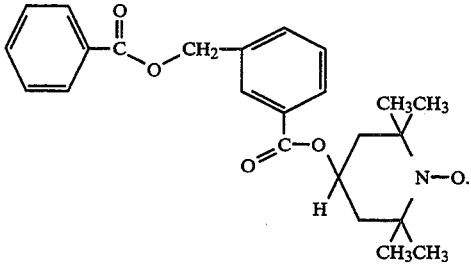 |
| 65 | 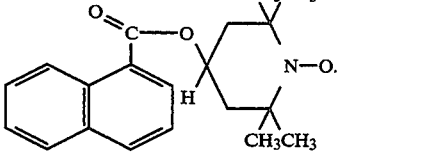 |
| 66 | 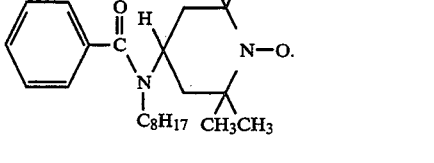 |
| 67 | 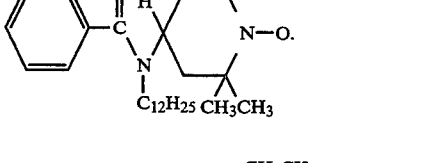 |
| 68 | 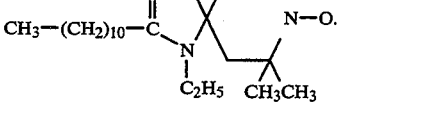 |

TABLE 4-continued

| Example | Nitroxyl compound |
|---------|-------------------|
| 69 | (fluorenone-carboxylate of 2,2,6,6-tetramethyl-4-hydroxypiperidin-1-oxyl) |
| 70 | (2-naphthoyl-N-ethyl amide of 4-amino-2,2,6,6-tetramethylpiperidin-1-oxyl) |
| 71 | (3,5-dinitrobenzoate of 2,2,6,6-tetramethyl-4-hydroxypiperidin-1-oxyl) |
| 72 | (4-heptyloxybenzoate of 2,2,6,6-tetramethyl-4-hydroxypiperidin-1-oxyl) |
| 73 | (4-butoxybenzoate of 2,2,6,6-tetramethyl-4-hydroxypiperidin-1-oxyl) |
| 74 | bis-piperidinyloxy compound with R = O=C−N−(CH$_2$)$_6$−N−C=O (dibenzoyl) |
| 75 | (2,4,6-trimethylbenzoate of 2,2,6,6-tetramethyl-4-hydroxypiperidin-1-oxyl) |
| 76 | bis-piperidinyloxy compound with R = O=C−N−(CH$_2$)$_2$−N−C=O (dibenzoyl) |
| 77 | (2-chloro-4-nitrobenzoate of 2,2,6,6-tetramethyl-4-hydroxypiperidin-1-oxyl) |

EXAMPLES 78–92

Example 1 is repeated, with the single exception that the nitroxyl compound of the formula XV is in each case employed in the amount by weight shown in Table 4 below, in % based on the pigment. The results are shown in Table 5.

TABLE 5

| Example | % of nitroxyl compound |
|---------|------------------------|
| 78 | 1 |
| 79 | 2 |
| 80 | 5 |
| 81 | 10 |
| 82 | 15 |
| 83 | 20 |
| 84 | 25 |
| 85 | 30 |
| 86 | 40 |
| 87 | 50 |
| 88 | 60 |
| 89 | 70 |
| 90 | 80 |
| 91 | 90 |
| 92 | 100 |

EXAMPLES 93–96

Solution A

Formulation

| | |
|---|---|
| 67.1 parts of A1: | 8.2% solution of 86 parts of cellulose acetobutyrate (25% in butyl acetate), 4 parts of zirconium octanoate, 48 parts of SOLVESSO 150 ® (aromatic solvent from ESSO), 70 parts butyl acetate and 52 parts of xylene; |
| 24.8 parts of A2: | polyester resin DYNAPOL H 700 ® (60%, from Dynamit Nobel); |
| 3.1 parts of A3: | melamine resin MAPRENAL MF 650 ® (55%, from Hoechst AG). |

Dispersion B

Formulation

| | |
|---|---|
| 12.3 parts | of aluminium paste Silverline 3334 ® (Silverline); |
| 8.0 parts | of SOLVESSO 150 ®; |
| 59.34 parts | of A1; |
| 21.92 parts | of A2; |
| 2.74 parts | of A3. |

A 1:1 mixture of a) a dispersion, obtained by conventional methods, of 5 parts of the pigment of the formula XIV and 5 pans of one of the nitroxyl compounds shown in Table 6 in solution A and b) the dispersion B is applied by means of a spray gun. After brief drying, a clear coat based on a thermocurable acrylic varnish is applied and stoved at 130° C. for 30 minutes. A red metal-effect finish is obtained.

A control coloured coating is produced in the same way, with the exception that the pigment is employed without addition of nitroxyl compounds.

The weathering resistance of the resultant coloured coatings is determined by the WOM test after weathering for 2000 hours.

All the examples show better weathering resistance than that of the control coloured coating.

TABLE 6

| Example | Nitroxyl compound |
|---|---|
| 93 | 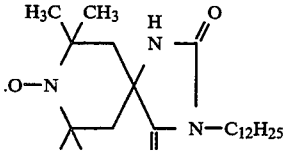 |
| 94 | 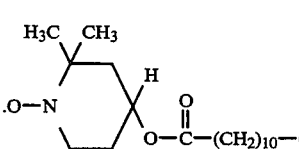 |
| 95 | 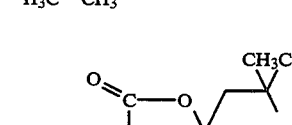 |
| 96 | 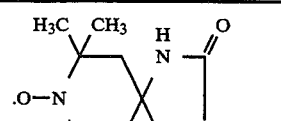 |

EXAMPLES 97–99

Example 93 is repeated, with the exception that the pigment of the formula XIV is replaced by the same amount by weight of the pigment of the formula XVII and the nitroxyl compounds shown in Table 7 below. In all the examples, better weathering resistance is observed than in the corresponding control coloured coating.

TABLE 7

| Example | Nitroxyl compound |
|---|---|
| 97 | |
| 98 | |
| 99 | |

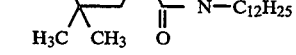

EXAMPLES 100–102

0.5 g of the pigment of the formula XIV, 0.1 g of one of the nitroxyl compounds shown in Table 8 below and 16.2 g of a nitrocellulose printing ink comprising 11 g of nitrocellulose A 250, 9 g of DOWANOL PM ®(Dow Chem.), 20 g of ethyl acetate and 60 g of ethanol are mixed by conventional methods. The printing ink obtained is applied to paper. The light stability is determined by the fadeometer test after exposure for 500 hours.

All three examples show better light fastnesss than the corresponding control, which is obtained in the same way, but without addition of the nitroxyl compound.

TABLE 8

| Example | Nitroxyl compound |
|---|---|
| 100 | |
| 101 | |

TABLE 8-continued

| Example | Nitroxyl compound |
|---|---|
| 102 | 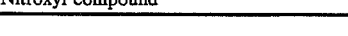 |

EXAMPLES 103-105

Examples 100-102 are repeated, with the single exception that the pigment of the formula XIV is replaced by the same amount by weight of the pigment of the formula XVII. These examples also show better light stability than in the corresponding control coloured coating.

EXAMPLE 106-108

0.7 g of the pigment of the formula XIV and 0.35 g of one of the nitroxyl compounds shown in Table 9 below are mixed in dry form with 700 g of polyethylene VESTOLEN A 6016 ® Hüls) and 1.4 g of calcium carbonate MILICARB ®. The mixture is subsequently extruded twice at 200° C. in a single-screw extruder. The resultant granules are convened into sheets in an injection-moulding machine at 200° C. The weathering resistance is determined by weathering the sheets as described in Example 1 for the coloured coatings. These examples also show better weathering resistance than in the corresponding control coloured coating without nitroxyl compounds.

TABLE 9

| Example | Nitroxyl compound |
|---|---|
| 106 | 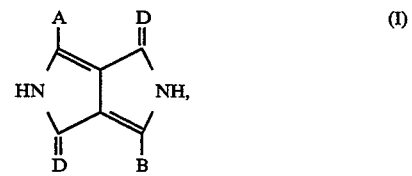 |
| 107 | 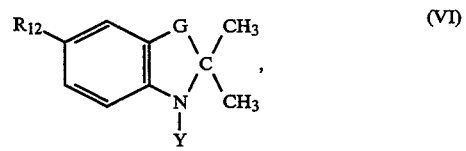 |

TABLE 9-continued

| Example | Nitroxyl compound |
|---|---|
| 108 | 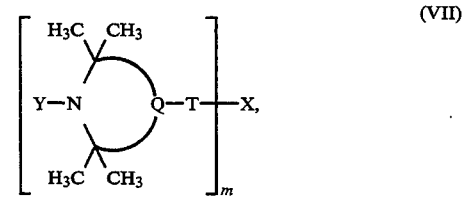 |

What is claimed is:

1. A light-stabilised pigment composition comprising
a) at least one pyrrolo[3,4-c]pyrrole pigment of the formula $$\text{(I)}$$

[structure with A, D, HN, NH, D, B]

in which

A and B, independently of one another, are isocyclic or heterocyclic aromatic radicals; and D is an oxygen or sulfur atom; and b) from 1 to 100% by weight, based on the pigment, of a nitroxyl compound of the formula

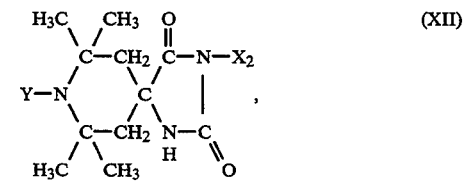

(VI)

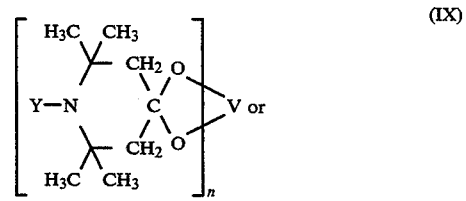

(VII)

(XII)

(IX)

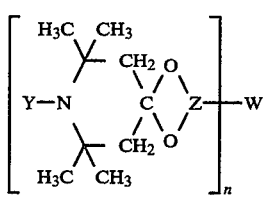

in which

R$_{12}$ is C$_1$-C$_{18}$alkyl or C$_1$-C$_{18}$alkoxy;

G is a divalent group of the formula —CR$_{13}$=CH— or —CHR$_{13}$—CH$_2$—;

R$_{13}$ is C$_1$-C$_{18}$alkyl;

Q is a group of the formula

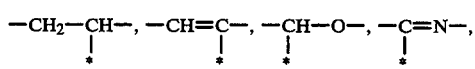

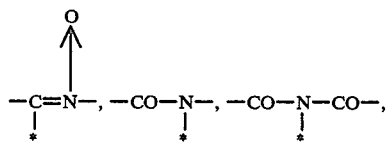

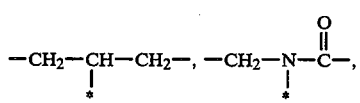

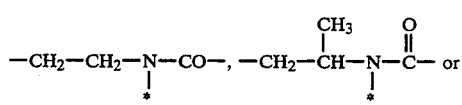

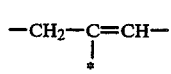

in which the bond denoted by * is the bond leading to T;

T is a direct bond or a group of the formula

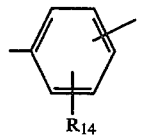

in which

R$_{14}$ is hydrogen, halogen or C$_1$-C$_4$alkyl, is —(CH$_2$—)$_r$—, in which r is 1 or 2;

m is the number 1, 2, 3, 4 or 6;

X, if m=1, is hydrogen, C$_1$-C$_{18}$alkyl, phenyl which is unsubstituted or substituted by C$_1$-C$_4$alkyl, C$_1$-C$_4$alkoxy, phenyl or halogen, or, under the condition that T, if bonded to a nitrogen atom, is not a direct bond, is a group of the formula —OCO—NR$_{15}$R$_{16}$, —OSO$_2$—NR$_{15}$R$_{16}$, —OCO—R$_{16}$, —COOR$_{16}$, —CONR$_{15}$R$_{16}$, —NR$_{15}$—COR$_{16}$, —NR$_{15}$—CONR$_{15}$R$_{16}$, —OR$_{16}$, —NR$_{15}$R$_{16}$,

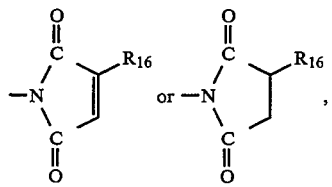

in which R$_{15}$ is hydrogen or C$_1$-C$_{18}$alkyl, R$_{16}$ is C$_1$-C$_{18}$alkyl, C$_2$-C$_{12}$alkenyl, C$_5$-C$_{12}$cycloalkyl, phenyl or naphthyl which is unsubstituted or substituted by C$_1$-C$_4$alkyl, C$_1$-C$_4$alkoxy, halogen, phenyl or nitro, or a —(CH$_2$)$_s$—CHR$_{17}$R$_{18}$ group where s is zero, 1, 2 or 3, R$_{17}$ is hydrogen, methyl or phenyl, and R$_{18}$ is —OH, halogen, —COOCH$_3$ or —COOC$_2$H$_5$;

X, if m=2, is a group of the formula —(CH$_2$)$_p$— or, under the condition that T, if bonded to a nitrogen atom, is not a direct bond, a group of the formula —O—(CH$_2$)$_p$—O—, —NR$_{15}$—(CH$_2$)$_p$—NR$_{15}$—, —OCO—M—COO—, —NR$_{15}$—CO—M—CO—NR$_{15}$—, —OCO—NH—M—NH—COO— or —NR$_{15}$—CONH—M—NHCO—NR$_{15}$—, in which M is —(CH$_2$)$_p$—,

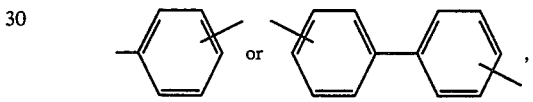

and p is a number between 2 and 10;

X, if m=3, is a

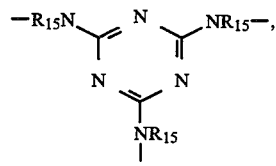

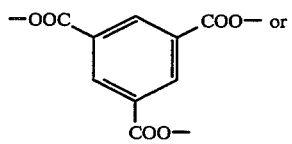

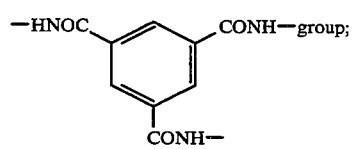

X, if m=4, is a

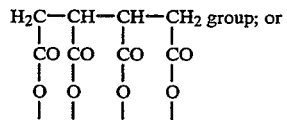

X, if m=6, is a $$\left[ \begin{array}{c} \text{H}_2\text{C}-\text{CH}-\text{CH}-\text{CH}_2-\text{COO}-\text{CH}_2- \\ \phantom{xx}|\phantom{xxx}|\phantom{xxx}| \\ \phantom{xx}\text{CO}\phantom{x}\text{CO}\phantom{x}\text{CO} \\ \phantom{xx}|\phantom{xxx}|\phantom{xxx}| \\ \phantom{xx}\text{O}\phantom{xxx}\text{O}\phantom{xxx}\text{O} \\ \phantom{xx}|\phantom{xxx}|\phantom{xxx}| \end{array} \right.$$

$$\left. \begin{array}{c} \text{CH}_3\phantom{x}\text{O}-\text{CH}_2\phantom{xx}\text{CH}_2-\text{O}\phantom{x}\text{CH}_3 \\ |\phantom{xx}\diagup\phantom{xxxxxx}\diagdown\phantom{xx}| \\ -\text{C}-\text{CH}\phantom{xx}\text{C}\phantom{xx}\text{CH}-\text{C}-\text{CH}_2- \\ |\phantom{xx}\diagdown\phantom{xxxxxx}\diagup\phantom{xx}| \\ \text{CH}_3\phantom{x}\text{O}-\text{CH}_2\phantom{xx}\text{CH}_2-\text{O}\phantom{x}\text{CH}_3 \end{array} \right]_2$$

group;

$X_2$ is $C_8$–$C_{18}$alkyl;

n is the number 1 or 2;

V, if n=1, is $C_2$–$C_8$alkylene, hydroxyalkylene or $C_4$–$C_{22}$acyloxyalkylene; or V, if n=2, is the $(-CH_2)_2C(CH_2-)_2$ or $$\diagdown\phantom{x}\diagup \\ \phantom{xx}\text{C} \\ \diagup\phantom{x}\diagdown$$

group;

Z is a group of the formula $$-\text{CH}_2-\text{CH}- \quad \text{or} \quad -\text{CH}_2-\text{C}(\text{C}_2\text{H}_5)-\text{CH}_2- \\ \phantom{xxxxx}|\phantom{xxxxxxxxxxxxxxxxxxx}| \\ \phantom{xxxxx}\text{CH}_2\phantom{xxxxxxxxxxxxxxxxx}\text{CH}_2 \\ \phantom{xxxxx}|\phantom{xxxxxxxxxxxxxxxxxxx}| \\ \phantom{xxxxx}*\phantom{xxxxxxxxxxxxxxxxxxxx}*$$

in which the bond denoted by * is the bond leading to W;

W, if n=1, is a —OCOR$_{19}$ group, in which R$_{19}$ is $C_1$–$C_{18}$alkyl, or phenyl or naphthyl which is unsubstituted or substituted by $C_1$–$C_4$alkyl, $C_1$–$C_4$alkoxy or halogen; or W, if n=2, is a group of the formula —OCO—(CH$_2$)$_p$—COO— or

—OCO—⌬—COO— ;

and

Y is O•.

2. A pigment composition according to claim 1, wherein the pigment is a pyrrolo[3,4-c]pyrrole of the formula I in which A and B, independently of one another, are groups of the formula

[three structures: phenyl with R$_1$, R$_2$; naphthyl with R$_1$, R$_2$; pyridyl N]

-continued

[three structures: pyrimidyl N,N; thienyl S; furyl O] or

[biphenyl structure with R$_5$, R$_4$, E, R$_6$, R$_3$]

in which

R$_1$ and R$_2$, independently of one another, are hydrogen, halogen, $C_1$–$C_6$alkyl, $C_1$–$C_{18}$alkoxy, $C_1$–$C_{18}$alkylmercapto, $C_1$–$C_{18}$alkylamino, CN, NO$_2$, phenyl, trifluoromethyl, $C_5$–$C_6$cycloalkyl, imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, E is —O—, —S—, —SO—, —SO$_2$— or —NR$_7$—, R$_3$ and R$_4$, independently of one another, are hydrogen, halogen, $C_1$–$C_6$alkyl, $C_1$–$C_{18}$alkoxy or CN, R$_5$ and R$_6$, independently of one another, are hydrogen, halogen or $C_1$–$C_6$alkyl, and R$_7$ is hydrogen or $C_1$–$C_6$alkyl.

3. A pigment composition according to claim 2, wherein the pigment is a pyrrolo[3,4-c]pyrrole of the formula I in which A and B, independently of one another, are groups of the formula

[three structures: phenyl with R$_1$, R$_2$; naphthyl; pyridyl N]

[pyridyl N or biphenyl with R$_4$, E, R$_3$]

in which

R$_1$ and R$_2$, independently of one another, are hydrogen, chlorine, bromine, $C_1$–$C_4$alkyl, $C_1$–$C_6$alkoxy, $C_1$–$C_6$alkylamino, CN or phenyl, E is —O—, —NR$_7$— or —SO$_2$—, R$_3$ and R$_4$ are hydrogen, R$_7$ is hydrogen, methyl or ethyl, and D is an oxygen atom.

4. A pigment composition according to claim 2, wherein the pigment is a pyrrolo[3,4-c]pyrrole of the formula

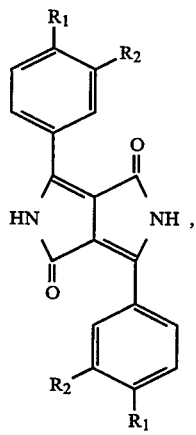

in which $R_1$ and $R_2$, independently of one another, are hydrogen, methyl, tert-butyl, chlorine, bromine, CN or phenyl.

5. A pigment composition according to claim 1, wherein the pyrrolo[3,4-c]pyrrole pigment is used in fine form having a mean particle size of from 0.005 to 0.1 μm.

6. A pigment composition according to claim 1, wherein the nitroxyl compound is employed in an amount of 5–100% by weight, based on the pigment.

7. A pigment composition according to claim 1, wherein an organic or inorganic salt of the nitroxyl compound is used.

8. A pigment composition according to claim 1, wherein a nitroxyl compound of the formula VII, VIII or IX as defined in claim 1 is used.

9. A pigment composition according to claim 1, wherein a nitroxyl compound of the formula

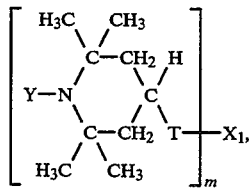 (XI)

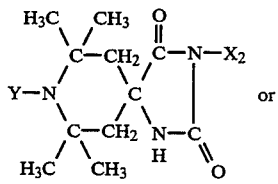 (XII)

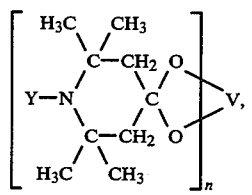 (XIII)

is used in which
T is a direct bond,
m is 1, 2 or 3,
$X_1$, if m=1, is $C_1$–$C_{18}$alkyl, —OCO—$R_{16}$, —NR$_{15}$—COR$_{16}$ or

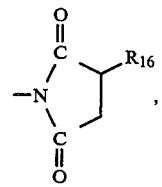 (II)

in which
$R_{15}$ is hydrogen or or $C_1$–$C_{18}$alkyl, and $R_{16}$ is $C_1$–$C_{18}$alkyl, or phenyl or naphthyl which is unsubstituted or substituted by $C_1$–$C_4$alkyl, $C_1$–$C_4$alkoxy, phenyl or halogen, if m=2, is a —OCO—(CH$_2$)$_p$—OCO— or —NR$_{15}$CO—(CH$_2$)$_p$—CONR$_{15}$— group in which p is a number between 2 and 8,

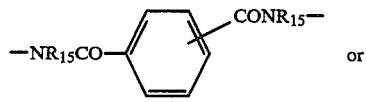 or

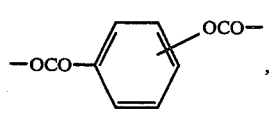, and
if m=3, is a

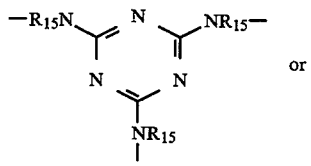 or

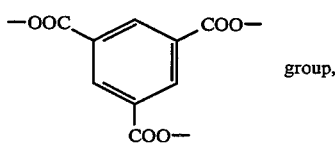 group, $X_2$ is $C_8$–$C_{18}$alkyl,
n is the number 2,
V is the (—CH$_2$)$_2$C(CH$_2$—)$_2$ or

group, and
Y is O•.

10. A pigment composition according to claim 9, wherein a nitroxyl compound of the formula XI or XII in which T is a direct bond, m is 1, $X_1$ is benzoyloxy or naphthyloxy, and $X_2$ is $C_8$–$C_{18}$alkyl, is employed.

11. A process for the light-stabilisation of pyrrolo[3,4-c]pyrrole pigments of the formula

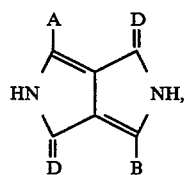 (I)

in which A and B, independently of one another, are isocyclic or heterocyclic aromatic radicals, and D is an oxygen or sulfur atom, by mixing or coating the pigment particles with from 1 to 100% by weight, based on the pigment, of a nitroxyl compound.

12. A high-mulecular-weight organic material containing a pigment composition according to claim 1.

13. A high-molecular-weight organic material according to claim 12, in the form of a paint.

14. A high-molecular-weight organic material according to claim 13, in the form of an automotive paint.

* * * * *